United States Patent
Ferrara

(10) Patent No.: US 7,234,071 B2
(45) Date of Patent: Jun. 19, 2007

(54) ON-CHIP REALTIME CLOCK MODULE HAS INPUT BUFFER RECEIVING OPERATIONAL AND TIMING PARAMETERS AND OUTPUT BUFFER RETRIEVING THE PARAMETERS

(75) Inventor: John Gregory Ferrara, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 390 days.

(21) Appl. No.: 10/720,785

(22) Filed: Nov. 24, 2003

(65) Prior Publication Data

US 2004/0107373 A1 Jun. 3, 2004

Related U.S. Application Data

(60) Provisional application No. 60/429,941, filed on Nov. 29, 2002.

(51) Int. Cl.
  *G06F 1/04* (2006.01)
(52) U.S. Cl. .................................. 713/600; 713/400
(58) Field of Classification Search ............. 713/500, 713/324, 340, 300, 400, 600
See application file for complete search history.

(56) References Cited

U.S. PATENT DOCUMENTS

| | | | | |
|---|---|---|---|---|
| 4,522,333 A | * | 6/1985 | Blau et al. ............... | 236/20 R |
| 4,573,127 A | * | 2/1986 | Korff ...................... | 700/296 |
| 5,778,239 A | * | 7/1998 | Cox ........................ | 713/340 |
| 5,860,125 A | * | 1/1999 | Reents .................... | 713/320 |
| 5,943,507 A | * | 8/1999 | Cornish et al. .......... | 710/48 |
| 5,999,921 A | * | 12/1999 | Arsenault et al. ....... | 705/410 |
| 6,754,784 B1 | * | 6/2004 | North et al. ............. | 711/145 |

* cited by examiner

*Primary Examiner*—Chun Cao
(74) *Attorney, Agent, or Firm*—Garlick Harrison & Markison; Robert A. McLauchlan, III

(57) ABSTRACT

A real time clock module maintains operating and timing parameters in "non-volatile" or persistent memory when an integrated circuit is powered down. The real time clock module provides is divided into an analog and a digital domain. The analog domain contains a number of persistent registers to store operational parameters and timing parameters. These persistent registers are powered by a battery and receive a timing clock signal from a crystal oscillator. A clock domain-crossing module operably couples to the persistent registers and allows the analog domain and the digital domain to be synchronized. An input buffer receives the operational and timing parameters for the persistent registers from the digital domain and an output buffer allows the digital domain to retrieve the operational parameters and timing parameters from the persistent registers according to the clock crossing domain module.

34 Claims, 9 Drawing Sheets real time clock module 22 real time clock module 22

CROSS CLOCK MODULE 76

CROSS CLOCK MODULE 76

ON-CHIP REALTIME CLOCK MODULE HAS INPUT BUFFER RECEIVING OPERATIONAL AND TIMING PARAMETERS AND OUTPUT BUFFER RETRIEVING THE PARAMETERS

RELATED APPLICATIONS

This application claims priority under 35 USC § 119(e) to U.S. Provisional Application No. 60/429,941 filed Nov. 29, 2002 entitled, "MULTI-FUNCTION HANDHELD DEVICE", and is incorporated herein by reference in its entirety.

TECHNICAL FIELD OF THE INVENTION

The present invention relates generally to integrated circuits, and more particularly to a system and method for providing "non-volatile" memory and real-time clock functionality to an integrated circuit.

BACKGROUND OF THE INVENTION

As is known, integrated circuits are used in a wide variety of electronic equipment, including portable, or handheld, devices. Such handheld devices include personal digital assistants (PDA), CD players, MP3 players, DVD players, AM/FM radio, pagers, cellular telephones, computer memory extension (commonly referred to as a thumb drive), etc. Each of these handheld devices includes one or more integrated circuits that provide the functionality of the device. For example, a thumb drive may include an integrated circuit that interfaces with a computer (e.g., personal computer, laptop, server, workstation, etc.) through the ports of the computer (e.g., Universal Serial Bus (USB), parallel port, etc.) and at least one other memory integrated circuit (e.g., flash memory). As such, when the memory extension couples to a computer, data can be read from and written to the memory of extension. Accordingly, a user may store personalized information (e.g., presentations, Internet access account information, etc.) on the memory extension and use any computer to access the information.

In another example, a media player may include multiple integrated circuits to support the storage and playback of digitally formatted media (i.e., formatted in accordance with the MP3 specification). As is known, one integrated circuit may be used for interfacing with a computer, another integrated circuit for generating a power supply voltage, another for processing the storage and/or playback of the digitally formatted audio data, and still another for rendering the playback of the digitally formatted audio data audible.

As is also known, integrated circuits have enabled the creation of a plethora of handheld devices, however, to be "wired" in today's electronic world, a person needs to possess multiple handheld devices. One may own a cellular telephone for cellular telephone service, a PDA for scheduling, address book, etc., one or more thumb drives for extended memory functionality, an MP3 player for storage and/or playback of digitally recorded music, a radio, etc. Thus, even though a single handheld device may be relatively small, carrying multiple handheld devices can become quite burdensome.

A vital concern with every battery powered handheld device is its battery life (i.e., how long the handheld device will run before the battery has to be replaced). There are two primary components to extending the battery life of a handheld device: one is to minimize power consumption and the other is to use the battery to its fullest capacity. Most of the efforts have been focused on reducing power consumption. While extremely important, effectively using the battery to its fullest extent is becoming more critical and receiving increased attention.

Current techniques to effectively use the battery to its fullest extent safely (i.e., shutting down the handheld device in a safe manner when the battery is consumed), monitor the battery voltage. When the battery voltage drops below a predetermined threshold, the device shuts down and stores current user settings. This allows for the device to power up in a known manner when the battery is replaced. If desired, the device may resume where it left off just before the device powered down. When the device is not shutdown in a known manner, the software may lock-up causing the device to require service.

While monitoring the battery voltage does provide a safe shutdown mechanism to extend the usefulness of the battery, it does not enable the battery to be used to its fullest extent, nor does it distinguish the possible reasons as to why the battery voltage dropped.

Therefore, a need exists for a method and apparatus that periodically stores the current operating conditions of a battery powered handheld device to ensure that the device can be restarted in a known manner.

SUMMARY OF THE INVENTION

The real time clock module of the present invention provides a system and method for maintaining operating and timing parameters when an integrated circuit is powered up and/or down to substantially meet these needs and others. In one embodiment, a real time clock module includes "non-volatile" or persistent memory to store operational and/or timing parameters when the integrated circuit is powered up and/or down.

In another embodiment, a real time clock module is divided into an analog and a digital domain. The analog domain contains a number of persistent registers that store operational parameters and timing parameters of the integrated circuit. These persistent registers are powered by a battery and receive a timing clock signal from a crystal oscillator. A clock domain crossing module operably couples to the persistent registers and allows the analog domain, containing the persistent registers, and the digital domain, having shadow registers, to be synchronized wherein the digital and analog domains utilize different clock signals. An input buffer receives the operational and timing parameters for the persistent registers from the digital domain and an output buffer allows the digital domain to retrieve the operational parameters and timing parameters from the persistent registers according to the clock crossing domain module.

In another embodiment the digital domain and analog domain of the real time clock module are powered by separate circuits and receive clock signals from separate circuits. For example, in one embodiment the digital domain is powered by the DC-to-DC converter used power the majority of the integrated circuit while the analog domain is coupled directly to a battery or other persistent power source. Similarly, the digital domain utilizes a clock signal, which may be common to the rest of the integrated circuit while the analog domain may utilize a crystal source directly. This crystal source may or may not be used to generate the digital domain clock signal. This ensures that the analog domain of the real time clock module remains active when the integrated circuit is powered down.

Another embodiment contained in this disclosure teaches a method of managing operational parameters and timing parameters for an integrated circuit, such as those integrated circuits contained within audio processing chips. This method involves periodically storing operational parameters and timing parameters of the integrated circuit within a real time clock module for later use by the integrated circuit. This real time clock module is provided with a separate power supply and clock signal. This separate power supply and clock signal may be a direct connection to a battery or other persistent power source and a direct connection to a crystal oscillator or other independent clock signal. The operational parameters and timing parameters are stored in the real time clock module either when a predetermined event occurs, at a specified periodicity, or when the data contained within those registers within the real time clock module becomes stale. The storing of these parameters involves a 2-step process. First, parameters from the integrated circuit are stored within shadow registers located within a digital domain of the integrated circuit. Then the parameters within the shadow registers are transferred from the shadow registers to persistent registers in an analog domain.

DETAILED DESCRIPTION OF THE INVENTION

Figure 1:
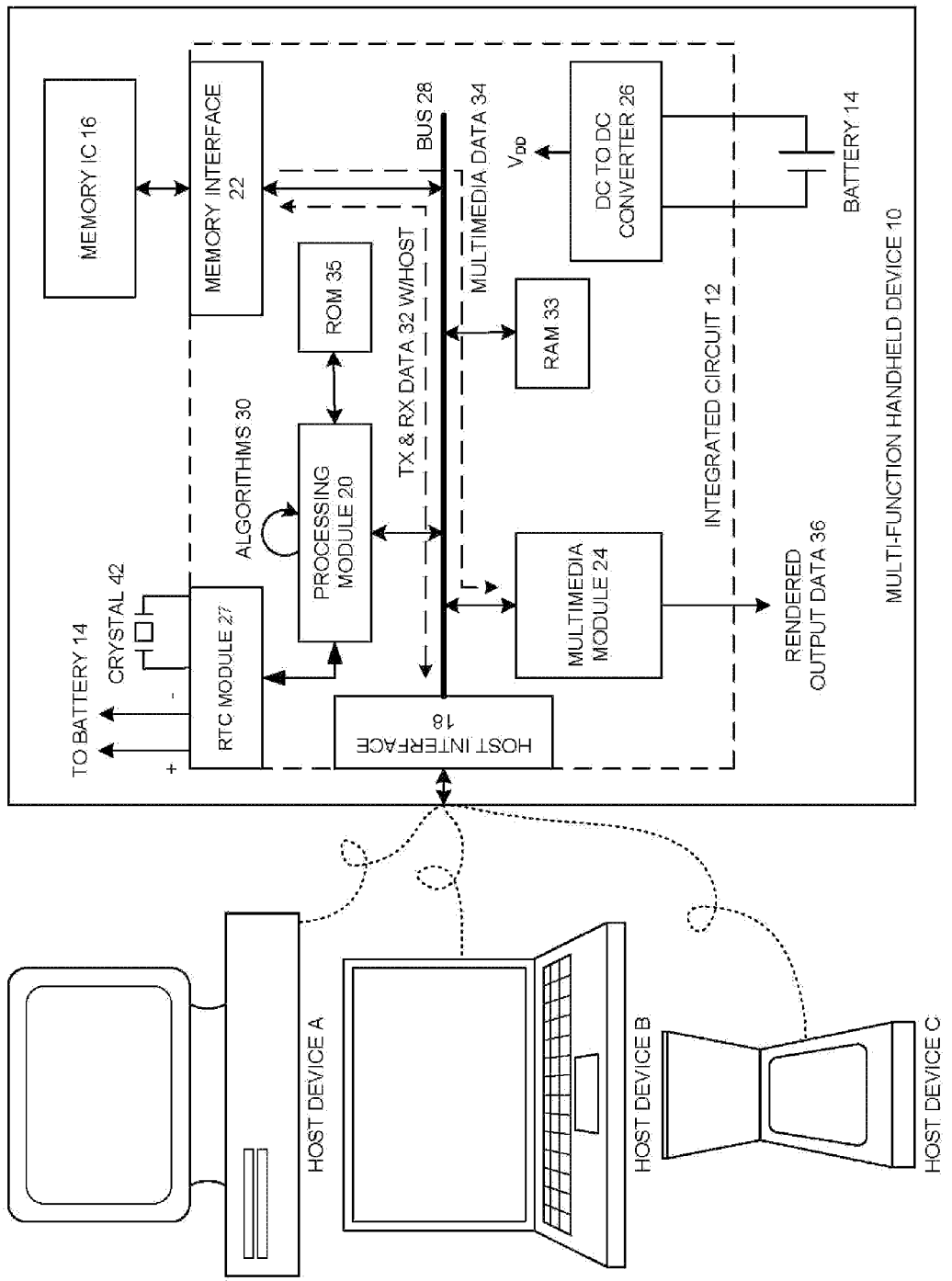
FIG. 1 is a schematic block diagram of a handheld device and corresponding integrated circuit in accordance with the present invention.

FIG. 1 is a schematic block diagram of a multi-function handheld device 10 and corresponding integrated circuit 12 operably coupled to a host device A, B, or C. The multi-function handheld device 10 also includes memory integrated circuit (IC) 16 and a battery 14. The integrated circuit 12 includes a host interface 18, a processing module 20, a memory interface 22, a multimedia module 24, a DC-to-DC converter 26, real time clock 27, and a bus 28. The multimedia module 24 alone or in combination with the processing module 20 provides the functional circuitry for the integrated circuit 12. DC-to-DC converter 26, which may be constructed in accordance with the teaching of U.S. Pat. No. 6,204,651, entitled METHOD AND APPARATUS FOR REGULATING A DC VOLTAGE, provides at least a first supply voltage to one or more of the host interface 18, the processing module 20, the multimedia module 24, and the memory interface 22. The DC-to-DC converter 26 may also provide $V_{DD}$ to one or more of the other components of the handheld device 10. Real time clock module 27 provide device 10 with the ability to save operating parameters and timing parameters. This ability ensures that device 10 may be recovered (i.e. shutdown and/or powered up) in a known condition.

When the multi-function handheld device 10 is operably coupled to a host device A, B, or C, which may be a personal computer, workstation, server (which are represented by host device A), a laptop computer (host device B), a personal digital assistant (host device C), and/or any other device that may transceive data with the multi-function handheld device, processing module 20 performs algorithms 30, which will be described in greater detail with reference to FIGS. 7–10, where the corresponding operational instructions of algorithm 30 are stored in memory 16 and/or in memory incorporated in the processing module 20. The processing module 20 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 20 implements one or more of its functions via a state machine, analog circuitry, digital circuitry, and/or logic circuitry, the associated memory storing the corresponding operational instructions is embedded with the circuitry comprising the state machine, analog circuitry, digital circuitry, and/or logic circuitry.

With the multi-function handheld device 10 in the first functional mode, the integrated circuit 12 facilitates the transfer of data between the host device A, B, or C and memory 16, which may be non-volatile memory (e.g., flash memory, disk memory, SDRAM) and/or volatile memory (e.g., DRAM). In one embodiment, the memory IC 16 is a NAND flash memory that stores both data and the operational instructions of at least some of the algorithms 30. The interoperability of the memory IC 16 and the integrated circuit 12 will be described in greater detail with reference to FIGS. 15–17.

In this mode, the processing module 30 retrieves a first set of operational instructions (e.g., a file system algorithm, which is known in the art) from the memory 16 to coordinate the transfer of data. For example, data received from the host device A, B, or C (e.g., Rx data) is first received via the host interface module 18. Depending on the type of coupling between the host device and the handheld device 10, the received data will be formatted in a particular manner. For example, if the handheld device 10 is coupled to the host device via a USB cable, the received data will be in accordance with the format proscribed by the USB specification. The host interface module 18 converts the format of the received data (e.g., USB format) into a desired format by removing overhead data that corresponds to the format of the received data and storing the remaining data as data words. The size of the data words generally corresponds directly to, or a multiple of, the bus width of bus 28 and the word line size (i.e., the size of data stored in a line of memory) of memory 16. Under the control of the processing module 20, the data words are provided, via the memory interface 22, to memory 16 for storage. In this mode, handheld device 10 functions as extended memory of the host device (e.g., like a thumb drive).

In furtherance of the first functional mode, the host device may retrieve data (e.g., Tx data) from memory 16 as if the memory were part of the computer. Accordingly, the host device provides a read command to the handheld device, which is received via the host interface 18. The host interface 18 converts the read request into a generic format and provides the request to the processing module 20. The processing module 20 interprets the read request and coordinates the retrieval of the requested data from memory 16 via the memory interface 22. The retrieved data (e.g., Tx data) is provided to the host interface 18, which converts the format of the retrieved data from the generic format of the handheld device into the format of the coupling between the handheld device and the host device. The host interface 18 then provides the formatted data to the host device via the coupling.

The coupling between the host device and the handheld device may be a wireless connection or a wired connection. For instance, a wireless connection may be in accordance with Bluetooth, IEEE 802.11(a), (b) or (g), and/or any other wireless LAN (local area network) protocol, IrDA, etc. The wired connection may be in accordance with one or more Ethernet protocols, Firewire, USB, etc. Depending on the particular type of connection, the host interface module 18 includes a corresponding encoder and decoder. For example, when the handheld device 10 is coupled to the host device via a USB cable, the host interface module 18 includes a USB encoder and a USB decoder.

As one of average skill in the art will appreciate, the data stored in memory 16, which may have 64 Mbytes or greater of storage capacity, may be text files, presentation files, user profile information for access to varies computer services (e.g., Internet access, email, etc.), digital audio files (e.g., MP3 files, WMA—Windows Media Architecture—, MP3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format. As one of average skill in the art will further appreciate, when the handheld device 10 is coupled to the host device A, B, or C, the host device may power the handheld device 10 such that the battery is unused.

When the handheld device 10 is not coupled to the host device, the processing module 20 executes an algorithm 30 to detect the disconnection and to place the handheld device in a second operational mode. In the second operational mode, the processing module 20 retrieves, and subsequently executes, a second set of operational instructions from memory 16 to support the second operational mode. For example, the second operational mode may correspond to MP3 file playback, digital dictaphone recording, MPEG file playback, JPEG file playback, text messaging display, cellular telephone functionality, and/or AM/FM radio reception. Each of these functions is known in the art, thus no further discussion of the particular implementation of these functions will be provided except to further illustrate the concepts of the present invention.

In the second operational mode, under the control of the processing module 20 executing the second set of operational instructions, the multimedia module 24 retrieves multimedia data 34 from memory 16. The multimedia data 34 includes at least one of digitized audio data, digital video data, and text data. Upon retrieval of the multimedia data, the multimedia module 24 converts the data 34 into rendered output data 36. For example, the multimedia module 24 may convert digitized data into analog signals that are subsequently rendered audible via a speaker or via a headphone jack. In addition, or in the alternative, the multimedia module 24 may render digital video data and/or digital text data into RGB (red-green-blue), YUV, etc., data for display on an LCD (liquid crystal display) monitor, projection CRT, and/or on a plasma type display. The multimedia module 24 will be described in greater detail with reference to FIGS. 2 and 3.

As one of average skill in the art (will recognize), the handheld device 10 may be packaged similarly to a thumb drive, a cellular telephone, pager (e.g., text messaging), a PDA, an MP3 player, a radio, and/or a digital dictaphone and offer the corresponding functions of multiple ones of the handheld devices (e.g., provide a combination of a thumb drive and MP3 player/recorder, a combination of a thumb drive, MP3 player/recorder, and a radio, a combination of a thumb drive, MP3 player/recorder, and a digital dictaphone, combination of a thumb drive, MP3 player/recorder, radio, digital dictaphone, and cellular telephone, etc.).

Figure 2:
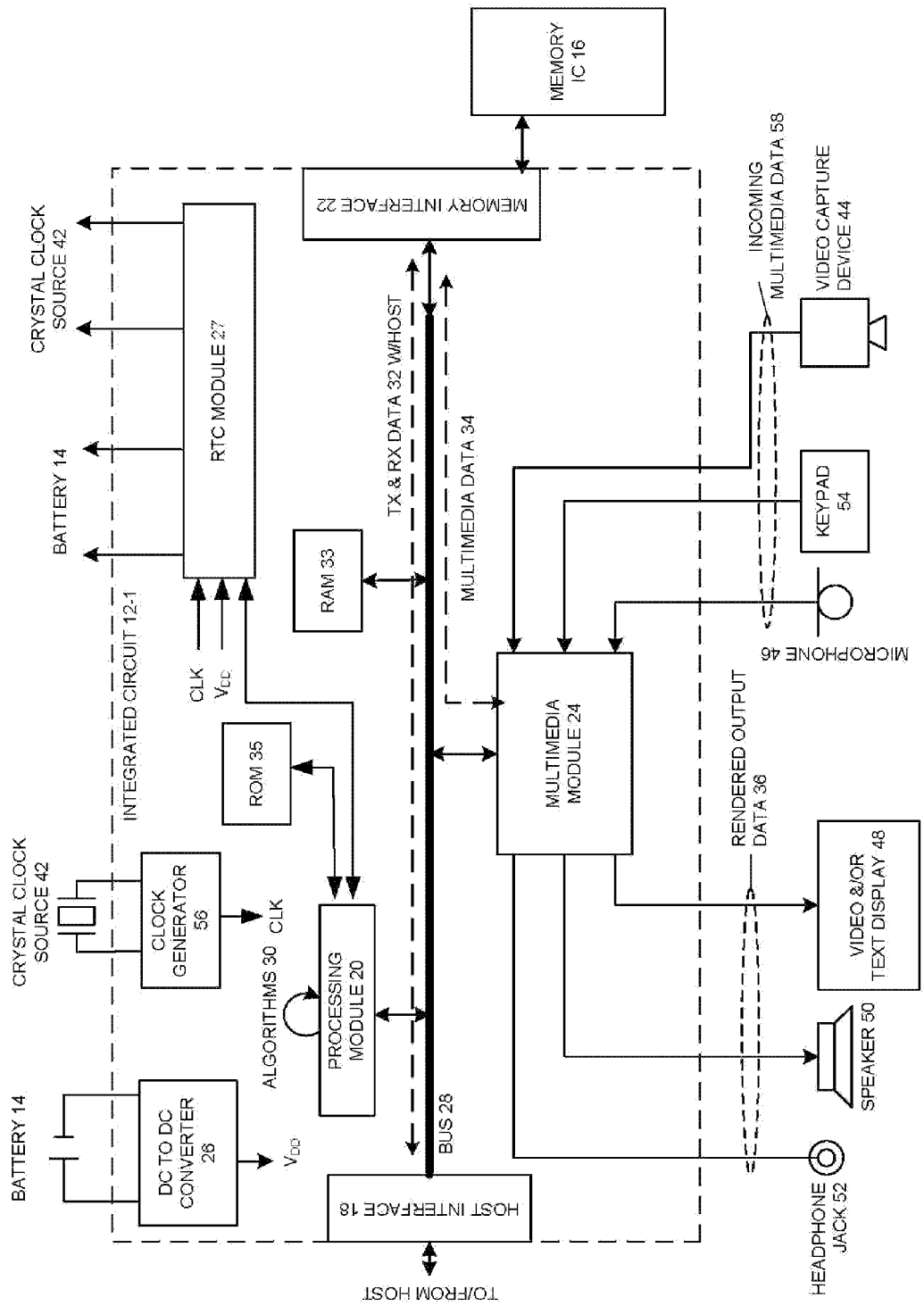
FIG. 2 is a schematic block diagram of another embodiment of a device with corresponding integrated circuits in accordance with the present invention.

FIG. 2 is a schematic block diagram of another device 40 and a corresponding integrated circuit 12-1. In this embodiment, the handheld device 40 includes the integrated circuit 12-1, the battery 14, the memory 16, a crystal clock source 42, one or more multimedia input devices (e.g., one or more video capture device(s) 44, keypad(s) 54, microphone(s) 46, etc.), and one or more multimedia output devices (e.g., one or more video and/or text display(s) 48, speaker(s) 50, headphone jack(s) 52, etc.). The integrated circuit 12-1 includes the host interface 18, the processing module 20, the memory interface 22, the multimedia module 24, the DC-to-DC converter 26, real time clock module 27, and clock generator 56, which produces a clock signal (CLK) for use by the other modules. As one of average skill in the art will appreciate, the clock signal CLK may include multiple synchronized clock signals at varying rates for the various operations of the multi-function handheld device.

Device 40 functions in a similar manner as handheld device 10 when exchanging data with the host device (i.e., when the handheld device is in the first operational mode). In addition, while in the first operational mode, the handheld device 40 may store digital information received via one of the multimedia input devices 44, 46, and 54. For example, a voice recording received via the microphone 46 may be provided as multimedia input data 58, digitized via the multimedia module 24 and digitally stored in memory 16. Similarly, video recordings may be captured via the video capture device 44 (e.g., a digital camera, a camcorder, VCR output, DVD output, etc.) and processed by the multimedia module 24 for storage as digital video data in memory 16. Further, the keypad 54 (which may be a keyboard, touch screen interface, or other mechanism for inputting text information) provides text data to the multimedia module 24 for storage as digital text data in memory 16. In this extension of the first operational mode, the processing module 20 arbitrates write access to the memory 16 among the various input sources (e.g., the host and the multimedia module).

When the handheld device 40 is in the second operational mode (i.e., not connected to the host), the handheld device may record and/or playback multimedia data stored in the memory 16. Note that the data provided by the host when the handheld device 40 was in the first operational mode includes the multimedia data. The playback of the multimedia data is similar to the playback described with reference to the handheld device 10 of FIG. 1. In this embodiment, depending on the type of multimedia data 34, the rendered output data 36 may be provided to one or more of the multimedia output devices. For example, rendered audio data may be provided to the headphone jack 52 and/or to the speaker 50, while rendered video and/or text data may be provided to the display 48.

The handheld device 40 may also record multimedia data 34 while in the second operational mode. For example, the handheld device 40 may store digital information received via one of the multimedia input devices 44, 46, and 54.

Figure 3:
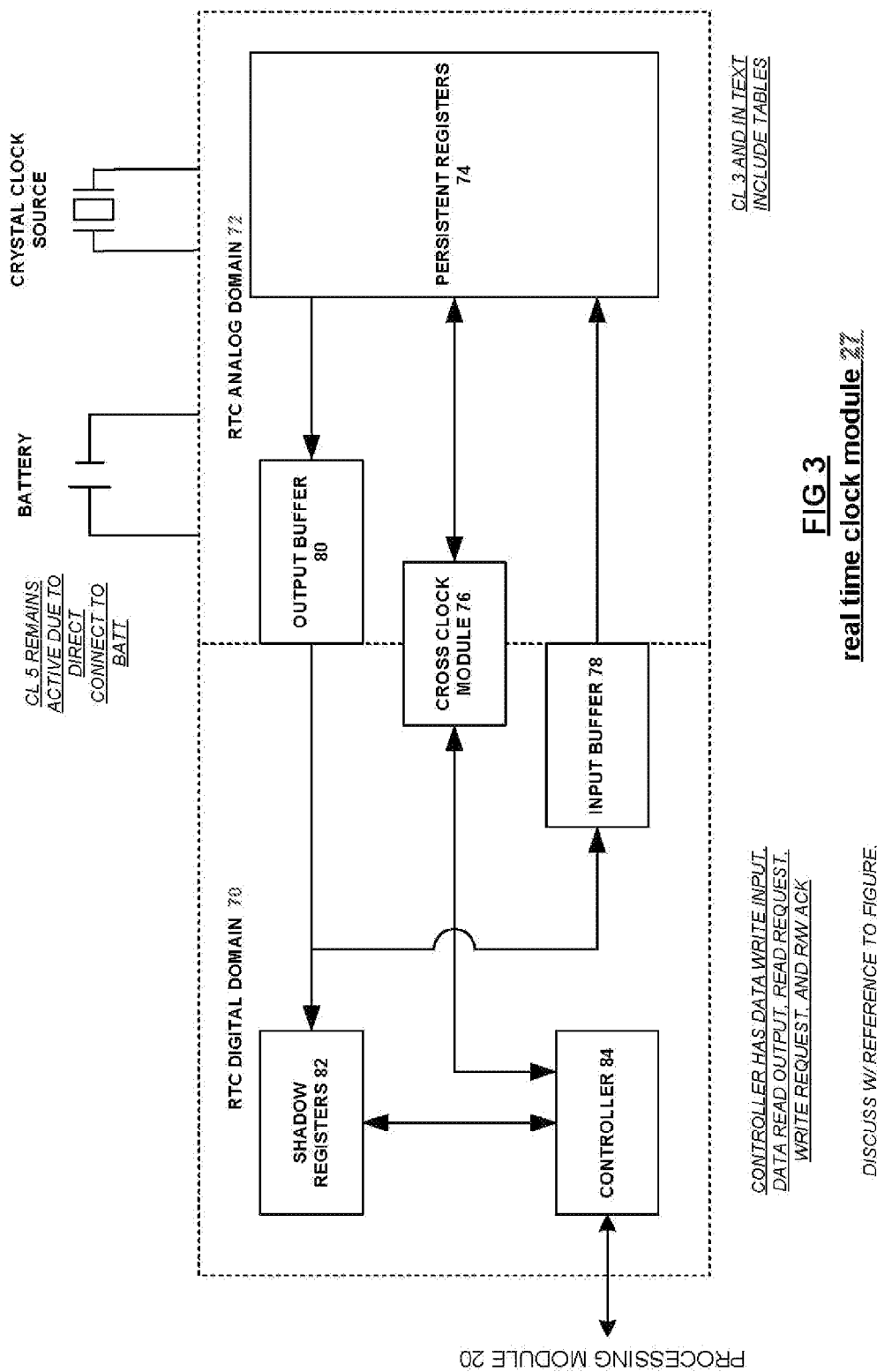
FIG. 3 is a block diagram of the real time clock module located in the integrated circuit described by FIGS. 1 and 2.

FIG. 3 is a schematic block diagram of an embodiment of the real time clock module 27 contained within FIGS. 1 and 2. Real time clock module 27 is divided into two sections, digital domain 70 and analog domain 72. The analog domain 72 includes persistent registers 74, output buffer 80, alarm clock/interrupt module 85. Analog domain 72 is powered by battery 14 and receives a clock signal from crystal clock source 42. The digital domain 70 includes shadow registers 82, input buffer 78 and controller 84. Cross clock module 76 synchronizes data between analog domain 72 and digital domain 70.

The persistent registers 74 enable real time clock module 27 to provide "non-volatile" storage area for maintaining data. This data may include the milliseconds count for use in the derivation of data/time. Additionally, the data may include but should not be limited to operating and timing parameters that will be described further in TABLEs 1 and 2. The "non-volatile" or persistent registers 74 are used by the integrated circuit 12, when integrated circuit 12 is powered up and or down as the analog domain is continuously powered by battery 14.

When the real time clock module is first powered up, controller 84 checks the information in shadow registers 82 to determine if the data is stale. If the data in shadow registers is stale, controller 84 directs that the data in shadow registers be updated from persistent registers 74. To update shadow registers 82, persistent registers 74 provide their contents to shadow registers 82 via output buffer 80. When shadow registers 82 have non-stale data, controller 84 provides the non-stale data to integrated circuit 12.

During normal operations, Controller 84, which may be under the direction of Processing Module 20, continuously verifies the state of shadow registers 82. If the data in shadow registers 82 is stale, the data is updated as required. This update may be required on a periodic schedule or when the data is found to be stale. Once an update is required controller 84 receives the data from integrated circuit 12 enables the transfer of data to analog domain 72. The persistent registers 74 receive the data directly from input buffer 78, which received its input from shadow registers 82. During normal operations data typically flows to the persistent registers 74, while at start up, data typically flows from the persistent registers 74.

Additionally, various conditions associated with the operation of the integrated circuit 12 may be monitored. These conditions, which include the battery reserve, help determine when a need exists to store the current operational parameters and timing parameters within persistent register 74. Monitoring the battery reserve allows that when the battery reserve drops below a predetermined threshold, processing module 20 may direct controller 84 to store a fresh set of operating parameters and timing parameters in persistent register 74 via shadow registers 82.

At power down, Controller 84, which may be under the direction of Processing Module 20, may direct that persistent registers 74 be updated with the most current operating and timing parameters. As stated above, this process may also be initiated when a low power condition, or other event likely to precede the powering down of integrated circuit 12, is detected in order to minimize data loss should power be disrupted to integrated circuit 12. In this case, the data in shadow registers 82 is updated and transferred to analog domain 72.

Each persistent register has a counterpart within the shadow register. Within the shadow registers is information that reflects the "staleness" of data contained within shadow register 2. Each shadow register should have one of three states describing this information. This information may describe that the shadow register: requires no action if the data is current; requires an update when the data contained therein is stale (in which case, the shadow register requires an update from persistent register 74 if integrated circuit 12 is not powered, or an update may be forced from the integrated circuit through controller 84 if the integrated circuit is powered), and requires that the shadow register update persistent registers 74 with new data.

Real time clock module 27 as previously stated is divided into a digital domain 70 and an analog domain 72. The digital domain 70 operates on a digital clock supplied by the integrated circuit 12, while analog domain 72 operates on a crystal clock source 42. Cross clock module 76 ensures data integrity when accessing registers from either clock domain (i.e., the analog domain accessing registers within the digital domain 70 or the digital domain 70 accessing registers within the analog domain 72.) Input buffer 78 and output buffer 80 provide further data reliability.

Tables 1 and 2 depict operational parameters and timing parameters (and their origination and functions) from integrated circuit 12 that may be stored and/or retrieved for integrated circuit 12. These parameters are stored within shadow registers 82 and persistent register 74.

TABLE 1

| PIN | DIRECTION | ORIGIN/DESTINATION | FUNCTION |
|---|---|---|---|
| Resetn | Input | Digital | Chip reset |
| Por | Input | Analog power-on reset circuit | Power-on reset |
| Rtc_disable | Input | Digital configuration register | Real time clock not enabled on silicon |
| Xtal_clk | Input | Analog | Crystal clk(24.576 MHZ) |
| Dclk | Input | Digital | Digital clock(100 MHZ) |
| Rtc_req | Input | Digital Real Time Clock (RTC) | Request for access to analog RTC |
| Rtc_ack | Output | Digital RTC | Acknowledge digital RTC request for access |
| Rtc_rwb | Input | Digital RTC | Read/Write_b strobe |
| Rtc_data_wr | Input | Digital RTC | Write data bus |
| Rtc_data_rd | Output | Digital RTC | Read Data bus |
| Inc_mseconds | Output | Digital RTC | Signals that shadow register should update contents |
| Alarm_wake | Output | DC-DC | DC-DC power-up interrupt |
| Alarm_buzz | Output | Digital-RTC | Set interrupt status bit if alarm enabled |
| Xtal_pdown | Output | Analog Crystal (XTAL) circuit | Powerdown crystal circuit |
| Scan_mode | Input | Digital | Part is in scan-test mode |

TABLE 1-continued

| PIN | DIRECTION | ORIGIN/DESTINATION | FUNCTION |
|---|---|---|---|
| Test_se | Input | Digital | Scan shift enable |
| Test_si | Input | Digital | Scan shift data-in |
| Test_so | Output | Digital | Scan shift data-out |

Reset values for the real time clock module are distributed between analog persistent registers and volatile digital registers. Since the persistent registers are not read from the analog area until the real time clock module is powered-up, the reset values are distributed between: Reset1 (directly out of chip-reset, or out of power-up, but before SoftReset=0); and Reset2 (after SoftReset=0 and registers have been updated). Table 2 describes many of these values.

TABLE 2

| Name | R/W | Reset1 | Reset2 | Description |
|---|---|---|---|---|
| SoftReset | R/W | 1 | 0 | Reset the RTC block. |
| ForceUpdate | R/W | 0 | 0 | Force an update of all digital shadow registers |
| NewRegs | R | 0 | 0 | These bits indicate that more current data has been written to a shadow register an that a write to the persistent area is pending. This information may specify that: persistent register1 is stale persistent register0 is stale alarm-count is stale mseconds-count is stale xtal-divide register is stale |
| StaleRegs | R | 1F | 0 | These bits indicate that more current data is available in the persistent area. An update of the shadow register will be required before accurate data can be obtained. This information may specify that: persistent register1 is stale persistent register0 is stale alarm-count is stale mseconds-count is stale xtal-divide register is stale |
| WatchdogEn | R/W | 0 | 0 | Enable for the Watchdog Timer |
| AlarmInt | R/W | 0 | 0 | Alarm Interrupt Status |
| AlarmIntEn | R/W | 0 | 0 | Alarm Interrupt Enable. Write a 1 to clear. |
| Mseconds0 | R/W | 0 | 0 | The lower word of the milli-seconds counter. To initiate a transfer to the persistent registers, both words must be written, lower-word (then) upper-word |
| Mseconds1 | R/W | 0 | 0 | The upper word of the milli-seconds counter. To initiate a transfer to the persistent registers, both words must be written, low-word(then)high-word |
| watchdog | R/W | FFFFFF | FFFFFF | The number of milli-seconds required before a watchdog timeout is initiated. |
| alarm0 | R/W | 0 | 0 | The lower word for the alarm clock setting. This value determines when the alarm clock interrupt/status will be asserted |
| alarm1 | R/W | 0 | 0 | The upper word for the alarm clock setting. This value determines when the alarm clock interrupt/status will be asserted |
| RTCDivide | R/W | 0 | 24000 | Set the xtal-clock divider to generate a milli-second clock for clocks. Default setting is for use with a 24.000 MHz XTAL . . . |
| XTALPwdn | R/W | 0 | 1 | XTAL Power-down Enable. Default state upon power-up is XTAL powered-down |
| AlarmWake | R/W | 0 | 0 | Wake-up STMP3500 upon assertion of alarm |
| AlarmEn | R/W | 0 | 0 | Enable for the Alarm Clock Function |
| Persistent | R/W | 0 | 0 | Additional persistent bits. These bits maintain value as long as a battery is connected and while digital is powered-down. |

Controller 84 may be directed by processing module 20 to store operational parameters and timing parameters such as those contained in Table 1 in persistent registers 74 at a predetermined frequency. Additionally, upon start-up processing module 20 may direct controller 84 to retrieve operational parameters and timing parameters from the shadow registers 82 or persistent registers 74. In the later case, controller 84 will direct that the shadow registers 82 be updated from the persistent registers 74 through output buffer 80 when shadow registers 82 are stale.

Real time clock module 27 may also have an alarm clock or interrupt module 85 contained within the analog domain 72. When an alarm setting is reached, interrupt module 85 issues an interrupt command to processing module 20 through controller 84. When integrated circuit 12 is powered down, interrupt module 85 directs the integrated circuit 12 to power up. At which time real time clock module 27 supplies the operational parameters and timing parameters for integrated circuit 12 from those parameters contained within the persistent registers 74. The present invention provides a significant advantage by using existing tools/processes to design and verify the circuits envisioned by the present invention, by modifying/leveraging the existing tools/processes.

Figure 4:
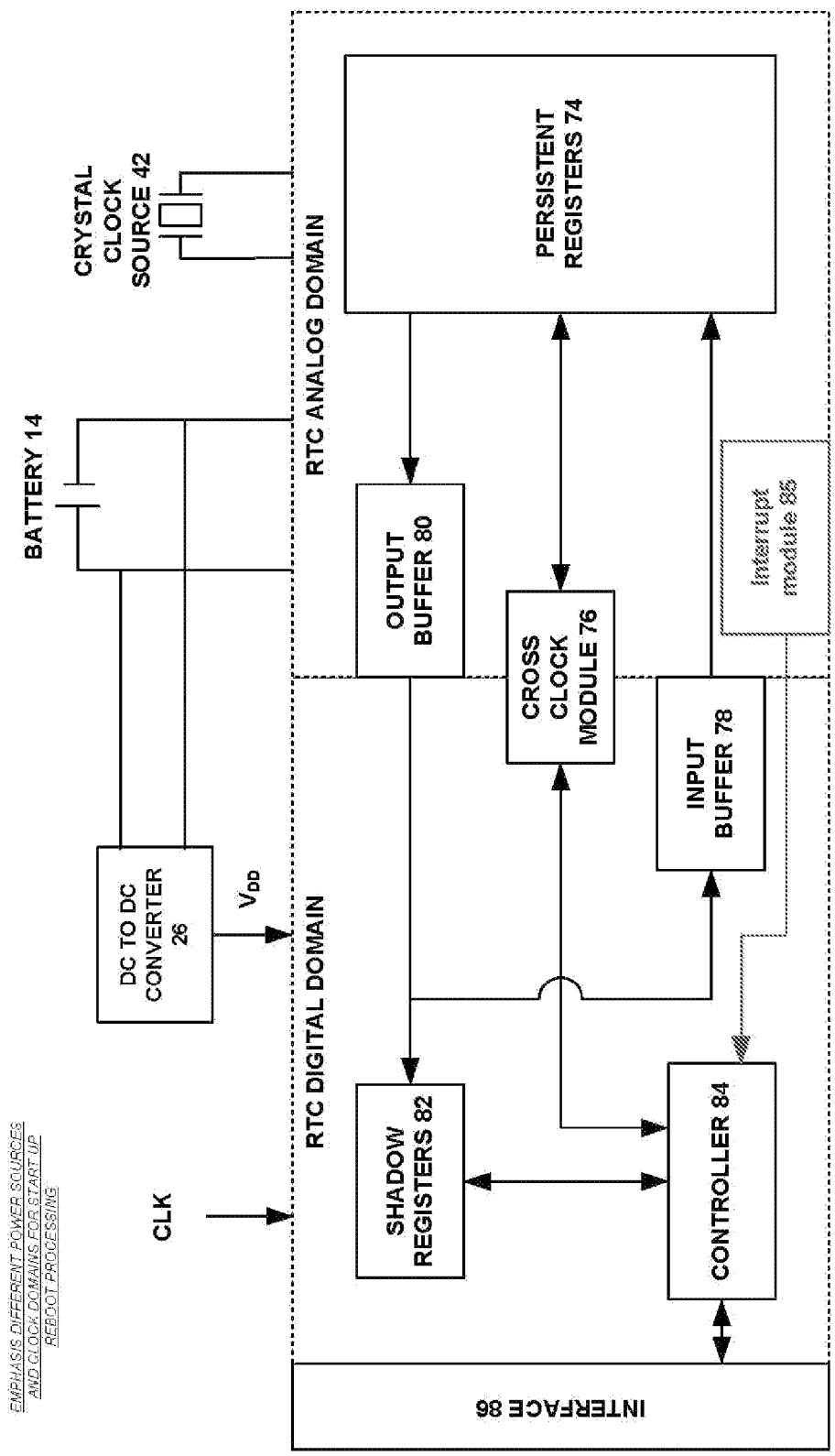
FIG. 4 illustrates an embodiment of another real time clock module in accordance with the present invention.

FIG. 4 depicts another embodiment of real time clock module 72 that essentially functions as FIG. 3 was previously described. FIG. 4 adds an interface 86 between controller 84 and processing module 20. Also, the digital domain is clearly illustrated as receiving a clock signal from integrated circuit 12 while analog domain 72 is clocked from crystal clock source 42. The power source for the analog domain differs from that of the digital domain. As shown here, DC-to-DC converter 26 supplies $V_{DD}$ to the digital domain from battery 14. Analog domain 72 receives power directly from battery 14 or another continuous power source. The differing source of clock signals and power for the analog domain and digital domain ensure that the analog domain remains powered up when power is lost or removed from the digital domain. Thus, the persistent registers 74 of the analog domain 72 can store data that would otherwise be lost or corrupted when power is lost or removed from the digital domain.

Figure 5:
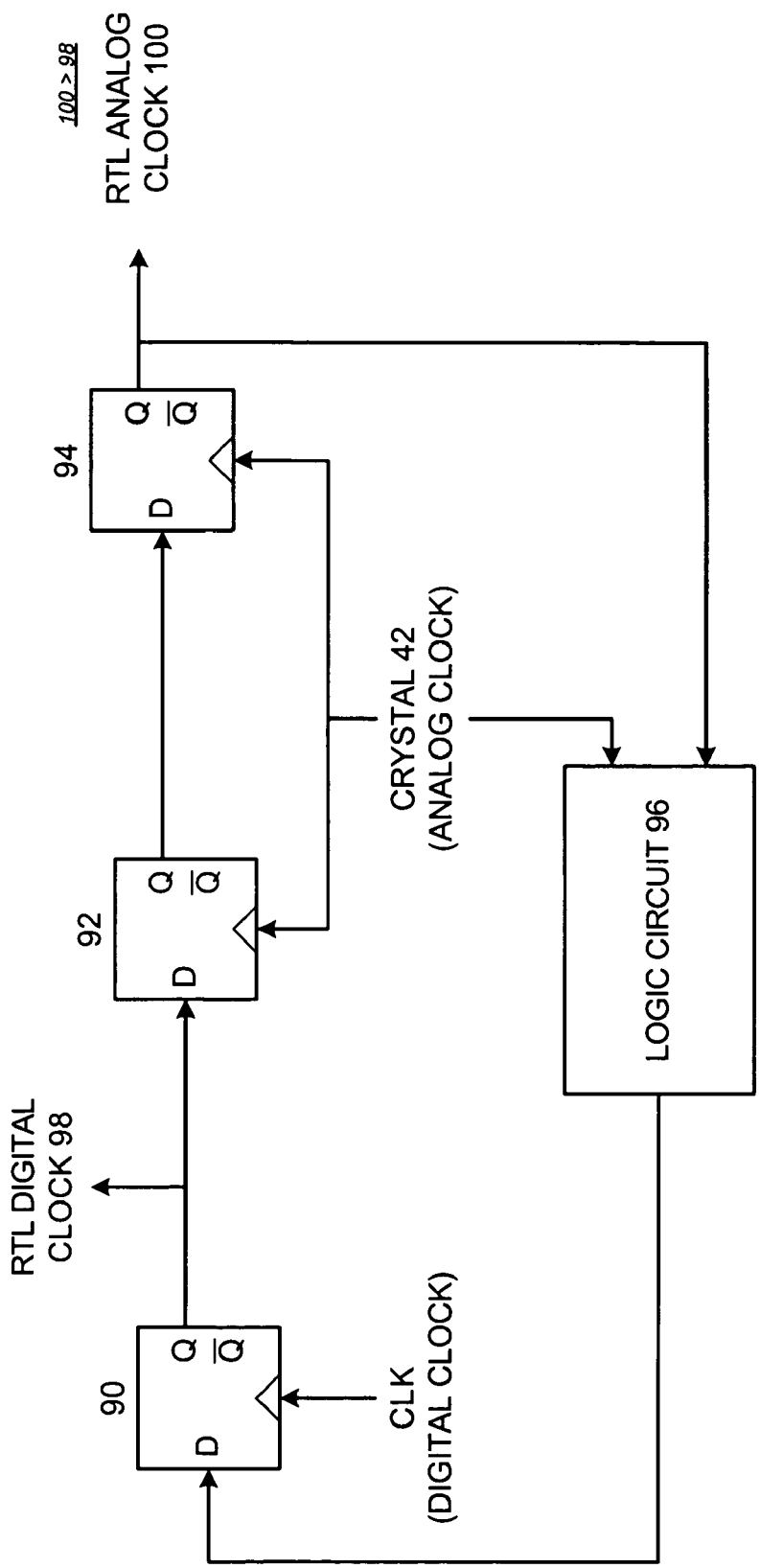
FIG. 5 depicts one embodiment of the cross-clock module contained within FIGS. 3 and 4.

FIG. 5 illustrates an embodiment of the cross-clock module 76. As shown flip-flops 90, 92 and 94 synchronize data between digital domain 70 and analog domain 72. In this case, the analog clock provided by the crystal source 42 operates at a higher frequency than that of the digital clock 98. These operations are coordinated by logic circuit 96.

Figure 6:
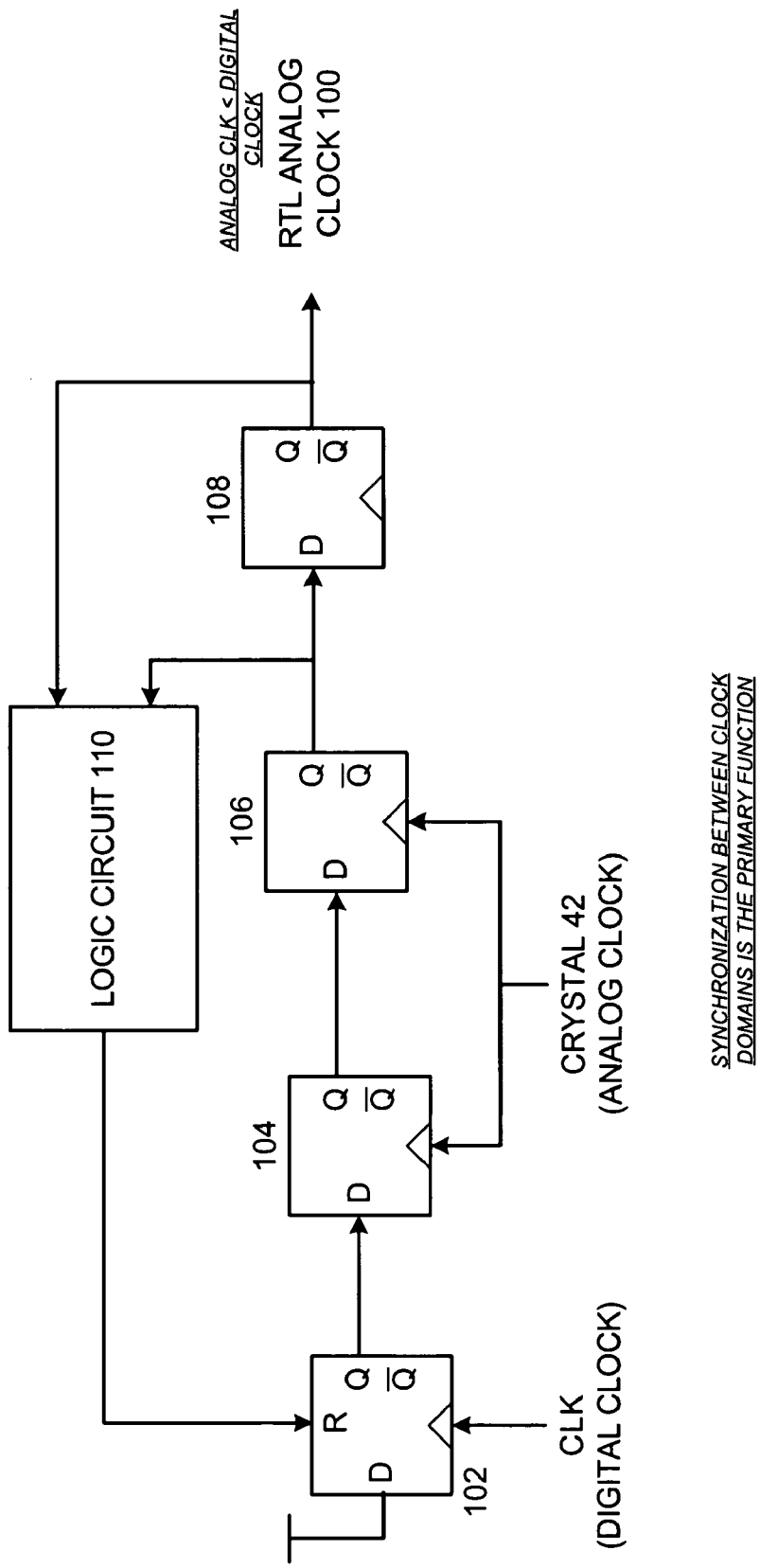
FIG. 6 presents another embodiment of the cross-clock module contained in FIGS. 3 and 4.

FIG. 6 provides another embodiment of cross-clock module 76 wherein flip-flops 102, 104, 106 and 108 synchronize data between digital domain 70 and analog domain 72 using logic circuit 110. In this case, the analog clock provided by crystal clock source 42 operates at a frequency less than that of the digital clock used within digital domain 70. This circuit allows for an arbitrary clock-relationship.

Figure 7:
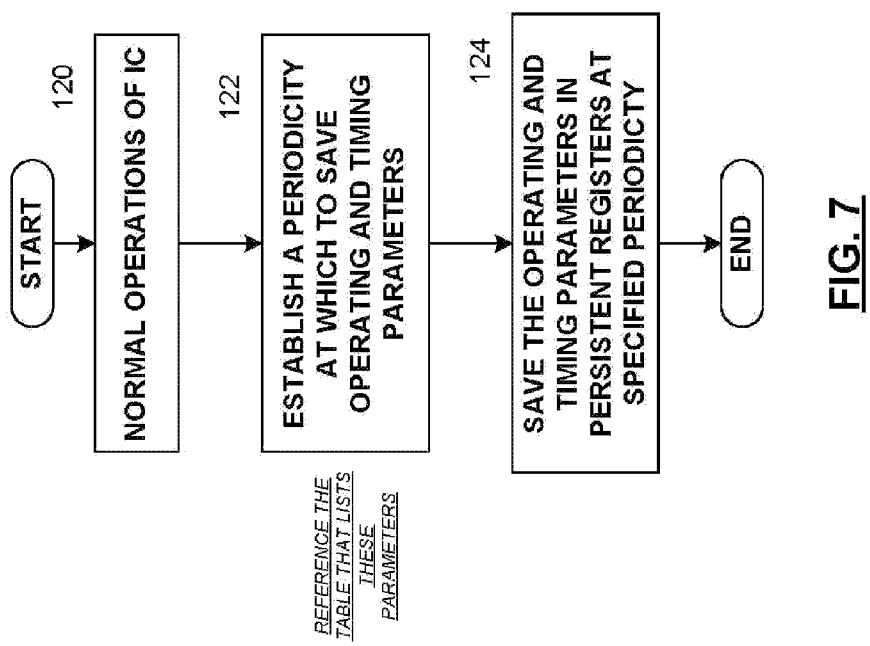
FIG. 7 is a logic diagram of a method for one process in accordance with the present invention.

FIG. 7 is a logic diagram that describes normal operations of integrated circuit 12 and begins with Step 120. Step 122 establishes a periodicity at which to save the operation parameters and timing parameters that were previously described in TABLEs 1 and 2. The controller and/or processing module of FIGS. 1–4 then direct that the operating and timing parameters be saved in persistent registers at the specified periodicity in step 214.

Figure 8:
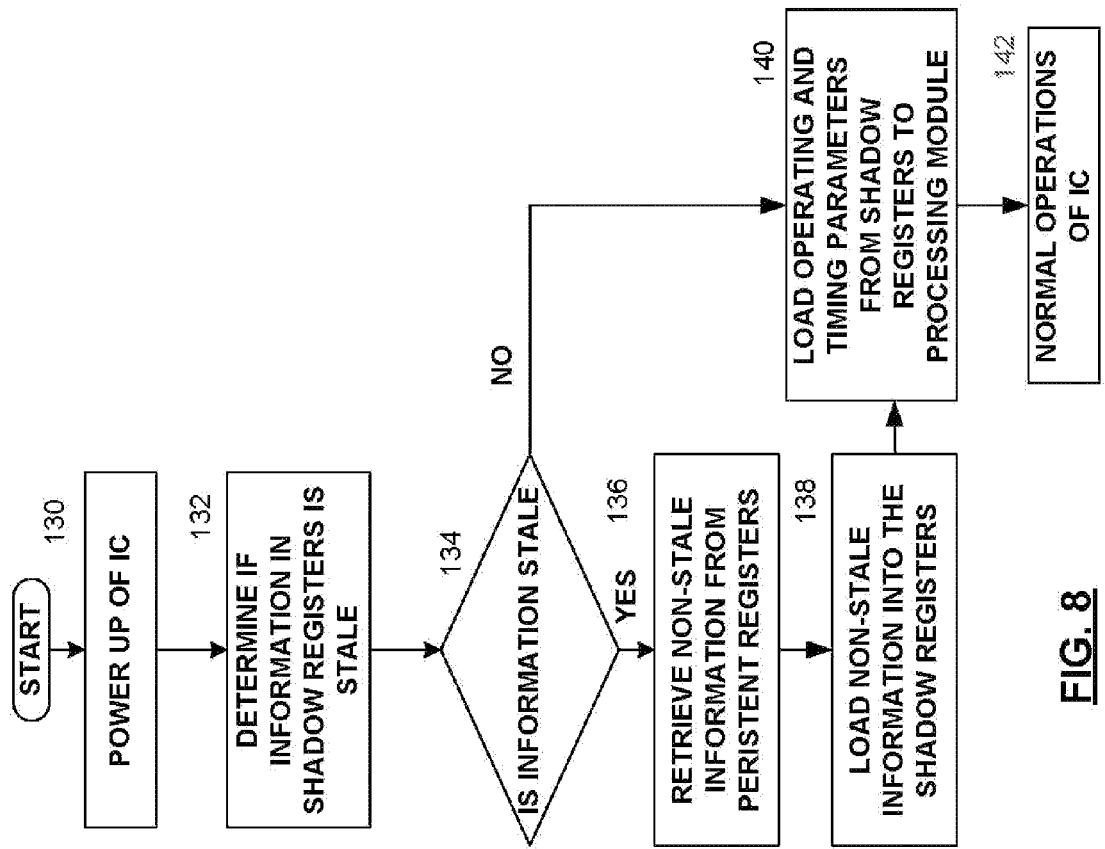
FIG. 8 is a logic diagram of a method which determines the updates information contained within registers in accordance with the present invention.

FIG. 8 is a logic diagram similar to that of FIG. 7 that adds to the basic process. FIG. 8 begins with the powering up of an integrated circuit at step 130. At power up, a determination is made in step 132 as the status of information contained within the shadow registers. If the information is stale at decision point 134, the process is directed to retrieve non-stale information from the persistent registers in step 136. This non-stale information is then loaded into the shadow registers at step 138. Then shadow registers load information to the integrated circuit and allow normal operations of the integrated circuit to continue. Returning to decision point 134, when the information is not stale, the information in the shadow registers is loaded directly to the integrated circuit at process step 140 to allow normal operations of the integrated circuit at Step 142.

Figure 9:
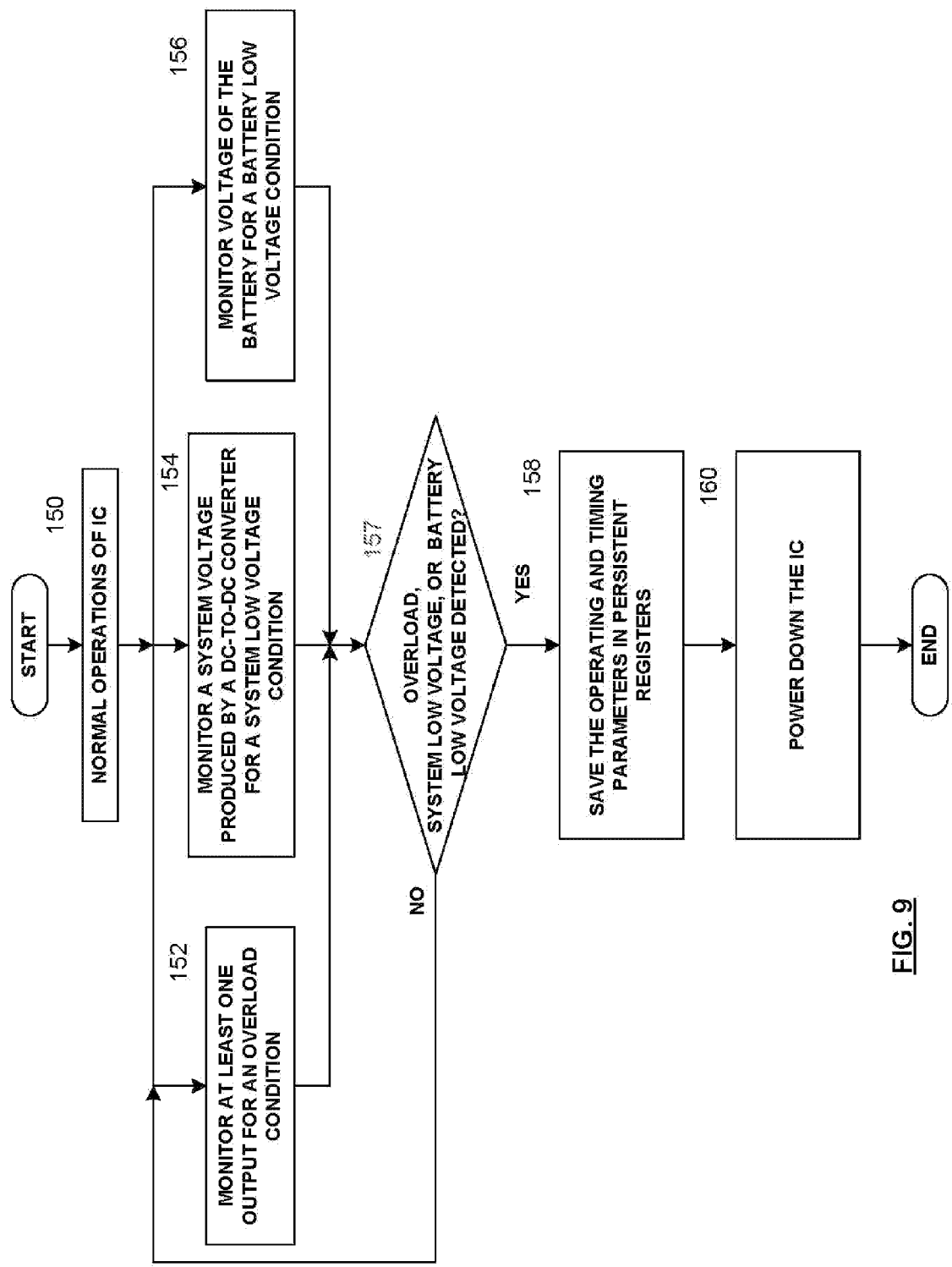
FIG. 9 is a logic diagram of a method in which operational and timing data is stored under predetermined conditions in accordance with the present invention.

FIG. 9 is a logic diagram that begins with normal operations of the integrated circuit at Step 150 that are monitored for various conditions. This may involve monitoring for an overload condition at step 152, in parallel with monitoring the system voltage of the DC-to-DC converter to determine when a system low voltage exists at process step 154, or directly monitoring the voltage of the battery in order to determine when the battery reserves or battery low voltage condition exists in step 156. At decision point 157, a determination is made as to whether or not any of the above-identified conditions exist. If they do not, monitoring of process steps 152, 154, and 156 continues in parallel. Otherwise, when a condition does exist, a generic process as described in steps 158 and 160 is executed. This process directs that the current operating and timing parameters of the integrated circuit be saved in the persistent registers. Then the integrated circuit is powered down at Step 160.

Figure 10:
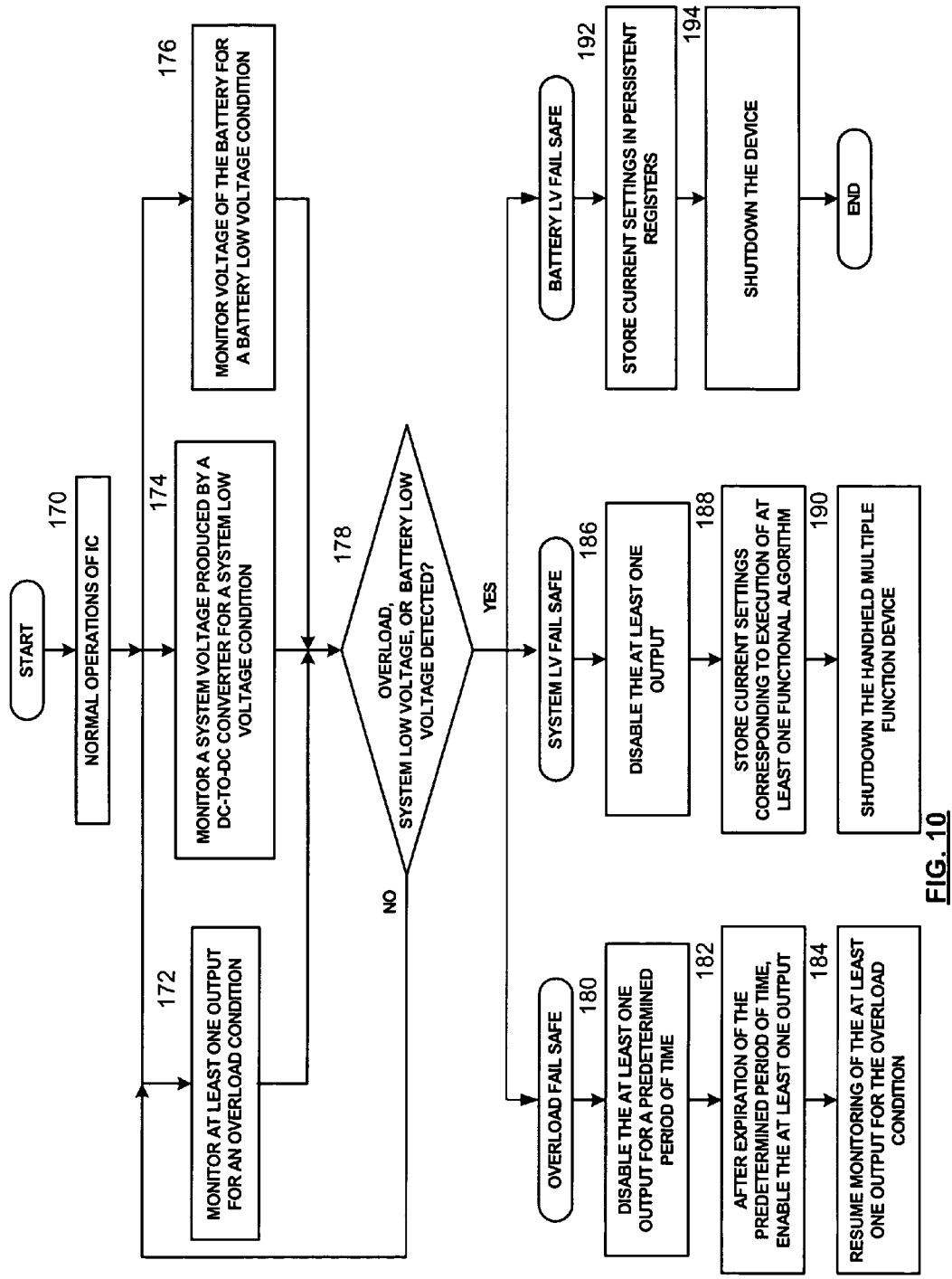
FIG. 10 is a logic diagram of a method that further details actions to be taken in accordance with the present invention.

FIG. 10 is a logic diagram that details a monitoring process similar to that of FIG. 9, wherein normal operations of the integrated circuit are underway at Step 170. Parallel monitoring for an overload condition, a low system voltage or low battery reserves occurs at Steps 172, 174 and 176, respectively. Should none of these conditions exist, this parallel monitoring continues from decision point 178.

If a condition does exist at decision point 178, a determination is made as to whether or not it is an overload condition. Should an overload condition exist at decision point 178, an output associated with the overload may be disabled for a predetermined period of time at Step 180. After the predetermined period of time has expired, the output will be re-enabled at which time monitoring for the overload condition and normal operations of the integrated circuit may continue.

Should a system low voltage occur, outputs may be disabled and the current operating and timing parameters may be stored in persistent registers at Step 188. After which, the multiple function device may be powered down at Step 190. Similarly, should the battery reserves reach a low threshold, the current settings for operating and timing parameters may be stored in persistent registers at Step 192 after which the device may be powered down and secured in Step 194.

Embodiments of the present invention may be applied to Digital Rights Management. For example, a circuit such as those disclosed may be modified to accommodate standards such as those where one is required to receive parameters related to decoding the encrypted stream from a host-controller. These parameters are stored within the analog domain for use through power-cycles to decode the data.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. An on-chip real time clock module for use on a digital processing integrated circuit, the on-chip real time clock module comprises:
    a plurality of persistent registers operable to periodically store operational parameters and timing parameters of the digital processing integrated circuit, wherein the plurality of persistent registers are powered by a battery and receive a timing signal from a crystal oscillator;
    a clock domain crossing module operably coupled to the plurality of persistent registers, wherein the clock crossing domain module synchronizes a crystal oscillator clock domain produced by the crystal oscillator and a system clock domain produced by a system clock circuit of the digital processing integrated circuit;
    an input buffer operably coupled to receive operational parameters and timing parameters from the digital processing integrated circuit in accordance with the system clock domain and to provide the operational parameters and timing parameters to one of the plurality of persistent registers in accordance with the crystal oscillator clock domain; and
    an output buffer operably coupled to retrieve operational parameters and timing parameters from the plurality of persistent registers in accordance with the crystal clock domain and to provide the retrieved operational parameters and timing parameters to the digital processing integrated circuit in accordance with the system clock domain.

2. The on-chip real time clock module of claim 1 that further comprises an interface between the on-chip real time clock module and the digital processing integrated circuit.

3. The on-chip real time clock module of claim 1, that further comprises a controller operable to direct the on-chip real time clock module to store operational parameters and timing parameters from the digital processing integrated circuit or retrieve operational parameters and timing parameters for the digital processing integrated circuit.

4. The on-chip real time clock module of claim 1, wherein the digital processing integrated circuit is powered by an on-chip DC-to-DC converter.

5. The on-chip real time clock module of claim 1, wherein the on-chip real time clock module remains active when the digital processing integrated circuit is powered down.

6. The on-chip real time clock module of claim 3, wherein a processor within the digital processing integrated circuit directs the on-chip real time clock module to store the operational parameters and timing parameters of the digital processing integrated circuit in the persistent registers at a predetermined frequency.

7. The on-chip real time clock module of claim 3, wherein a processor within the digital processing integrated circuit directs the on-chip real time clock module to supply the operational parameters and timing parameters from the persistent registers to the digital processing integrated circuit at startup.

8. The on-chip real time clock module of claim 3, wherein the on-chip real time clock module interrupts the digital processing integrated circuit when an alarm clock setting is reached.

9. The on-chip real time clock module of claim 3, wherein:
    the on-chip real time clock module directs the digital processing integrated circuit to power up when an alarm clock setting is reached; and
    the on-chip real time clock module supplies the operational parameters and timing parameters of the digital processing integrated circuit in the persistent registers at power up.

10. The on-chip real time clock module of claim 3, wherein a processor within the digital processing integrated circuit directs the on-chip real time clock module to supply the operational parameters and timing parameters of the digital processing integrated circuit in the persistent registers when the operational parameters and timing parameters of the digital processing integrated circuit are stale.

11. The on-chip real time clock module of claim 3, wherein a processor within the digital processing integrated circuit directs the on-chip real time clock module to store the operational parameters and timing parameters of the digital processing integrated circuit in the persistent registers when the battery reserve drops below a predetermined threshold, and then directs the digital processing integrated circuit to power down.

12. The on-chip real time clock module of claim 1, wherein the on-chip real time clock is located on an audio processing chip.

13. A digital processing integrated circuit that comprises:
    a plurality of integrated circuits;
    a system clock module operably coupled to produce a system clock from a crystal oscillator;
    a DC-to-DC convener operably coupled to power the digital circuitry and the system clock module from a battery; and
    an on-chip real time clock module that comprises:
        a plurality of persistent registers to store operational parameters and timing parameters of the digital processing integrated circuit, wherein the plurality of persistent registers are powered by the battery and receive a timing signal from a crystal oscillator;
        a clock domain crossing module operably coupled to the plurality of persistent registers, wherein the clock crossing domain module synchronizes the crystal oscillator clock domain produced by the crystal oscillator and a system clock domain produced by a system clock circuit of the digital processing integrated circuit;

an input buffer operably coupled to receive operational parameters and timing parameters from the digital processing integrated circuit in accordance with the system clock domain and to provide the operational parameters and timing parameters to one of the plurality of persistent registers in accordance with the crystal oscillator clock domain; and an output buffer operably coupled to retrieve operational parameters and timing parameters from the plurality of persistent registers in accordance with the crystal clock domain and to provide the retrieved operational parameters and timing parameters to the digital processing integrated circuit in accordance with the system clock domain.

14. The digital processing integrated circuit of claim 13 that further comprises an interface between the on-chip real time clock module and the digital processing integrated circuit.

15. The digital processing integrated circuit of claim 13 that further comprises a controller operable to direct the on-chip real time clock module to store operational parameters and timing parameters from the digital processing integrated circuit or retrieve operational parameters and timing parameters for the digital processing integrated circuit.

16. The digital processing integrated circuit of claim 13 wherein the digital processing integrated circuit is powered by the on-chip DC-to-DC converter.

17. The digital processing integrated circuit of claim 13 wherein the on-chip real time clock module remains active when the digital processing integrated circuit is powered down.

18. The digital processing integrated circuit of claim 17, wherein a processor within the digital processing integrated circuit directs the on-chip real time clock module to store the operational parameters and timing parameters of the digital processing integrated circuit in the persistent registers at a predetermined frequency.

19. The digital processing integrated circuit of claim 17, wherein a processor within the digital processing integrated circuit directs the on-chip real time clock module to supply the operational parameters and timing parameters of the digital processing integrated circuit in the persistent registers at startup.

20. The digital processing integrated circuit of claim 17, wherein the on-chip real time clock module may interrupt the digital processing integrated circuit when an alarm clock selling is reached.

21. The digital processing integrated circuit of claim 17, wherein:
the on-chip real time clock module directs the digital processing integrated circuit to power up when an alarm clock setting is reached; and
the on-chip real time clock module supplies the operational parameters and timing parameters of the digital processing integrated circuit in the persistent registers at power up.

22. The digital processing integrated circuit of claim 17, wherein a processor within the digital processing integrated circuit directs the on-chip real time clock module to supply the operational parameters and timing parameters of the digital processing integrated circuit in the persistent registers when the operational parameters and timing parameters of the digital processing integrated circuit are stale.

23. The digital processing integrated circuit of claim 17, wherein a processor within the digital processing integrated circuit directs the on-chip real time clock module to store the operational parameters and timing parameters of the digital processing integrated circuit in the persistent registers when the battery reserve drops below a predetermined threshold, and then directs the digital processing integrated circuit to power down.

24. A method of managing operational parameters and timing parameters of a digital processing integrated circuit located on an audio processing chip, that comprises:
periodically storing the operational parameters and timing parameters of the digital processing integrated circuit in an on-chip real time clock module for later use by a digital processing integrated circuit;
providing the on-chip real time clock module a power source that remains active when the digital processing integrated circuit is powered down;
providing the on-chip real time clock module a clock signal from a crystal oscillator that remains active when the digital processing integrated circuit is powered down; and
providing the operational parameters and timing parameters stored in the on-chip real time clock module to the digital processing integrated circuit when the operational parameters and timing parameters in the digital processing integrated circuit are stale.

25. The method of claim 24, wherein the operational parameters and timing parameters stored in the digital processing integrated circuit are stored within shadow registers.

26. The method of claim 25, wherein the operational parameters and timing parameters contained within the shadow registers return to a default condition when the digital processing integrated circuit is powered down.

27. The method of claim 24, further comprising:
monitoring battery power levels to the audio processing chip;
directing the on-chip real time clock module to store current operational parameters and timing parameters from the digital processing integrated circuit; and
directing the digital processing integrated circuit to power down.

28. The method of claim 24, wherein:
the on-chip real time clock module operates in a crystal oscillator clock domain; and
the digital processing integrated circuit operates in a system clock domain.

29. The method of claim 28, that further comprises synchronizing the crystal oscillator clock domain and system clock domain with a clock domain-crossing module operably coupled to a plurality of persistent registers.

30. The method of claim 24 further comprises:
buffering operational parameters and timing parameters from the digital processing integrated circuit in accordance with the system clock domain; and
buffering operational parameters and timing parameters from the on-chip real time clock module for the digital processing integrated circuit in accordance with the crystal clock domain.

31. The method of claim 24, further comprises maintaining the on-chip real time clock module in a powered state the when the digital processing integrated circuit is powered down.

32. The method of claim 24, wherein the operational parameters and timing parameters in the digital processing integrated circuit at startup are stale.

33. The method of claim 24, further comprising issuing an interrupt from the on-chip real time clock module to the digital processing integrated circuit when an alarm clock setting is reached.

34. The method of claim 33, wherein:

the on-chip real time clock module directs the digital processing integrated circuit to power up when the alarm clock selling is reached; and the on-chip real time clock module supplies the operational parameters and timing parameters of the digital processing integrated circuit in the persistent registers at power up.

* * * * *